United States Patent [19]
Hodgson et al.

[11] Patent Number: 6,104,846
[45] Date of Patent: Aug. 15, 2000

[54] SYSTEM FOR SPLICING SENSORS INTO A MULTIPLE FIBER OPTICAL CABLE

[75] Inventors: Craig W. Hodgson, Thousand Oaks; Donald A. Frederick, Woodland Hills, both of Calif.

[73] Assignee: Litton Systems, Inc., Woodland Hills, Calif.

[21] Appl. No.: 09/127,879

[22] Filed: Jul. 31, 1998

[51] Int. Cl.[7] .................................................. G02B 6/00
[52] U.S. Cl. ............................................... 385/12; 385/95
[58] Field of Search ............................. 385/12, 95, 115, 385/120, 135

[56] References Cited

U.S. PATENT DOCUMENTS 5,930,415  7/1999  Pham ......................................... 385/13
5,997,186  12/1999  Huynh et al. ............................. 385/99

Primary Examiner—Darren E. Schuberg
Attorney, Agent, or Firm—Knobbe, Martens, Olson & Bear, LLP

[57] ABSTRACT

The length of optical cable affected when splicing in sensors is reduced by cutting and splicing two distribution fiber lines and two return fiber lines to each sensor. The cable includes a spare distribution fiber line and a spare return fiber line. The optical cable is first stripped back to expose the optical fibers therein. For both the distribution and return lines, one fiber is cut at the proximal end of the stripped back portion of the cable, and another fiber is cut at the distal end of the stripped back portion. These fibers are then fused to respective ports on the sensor. Thus, each of the optical channels is formed from more than one optical fiber. The resulting cable is less stiff and more flexible.

20 Claims, 8 Drawing Sheets

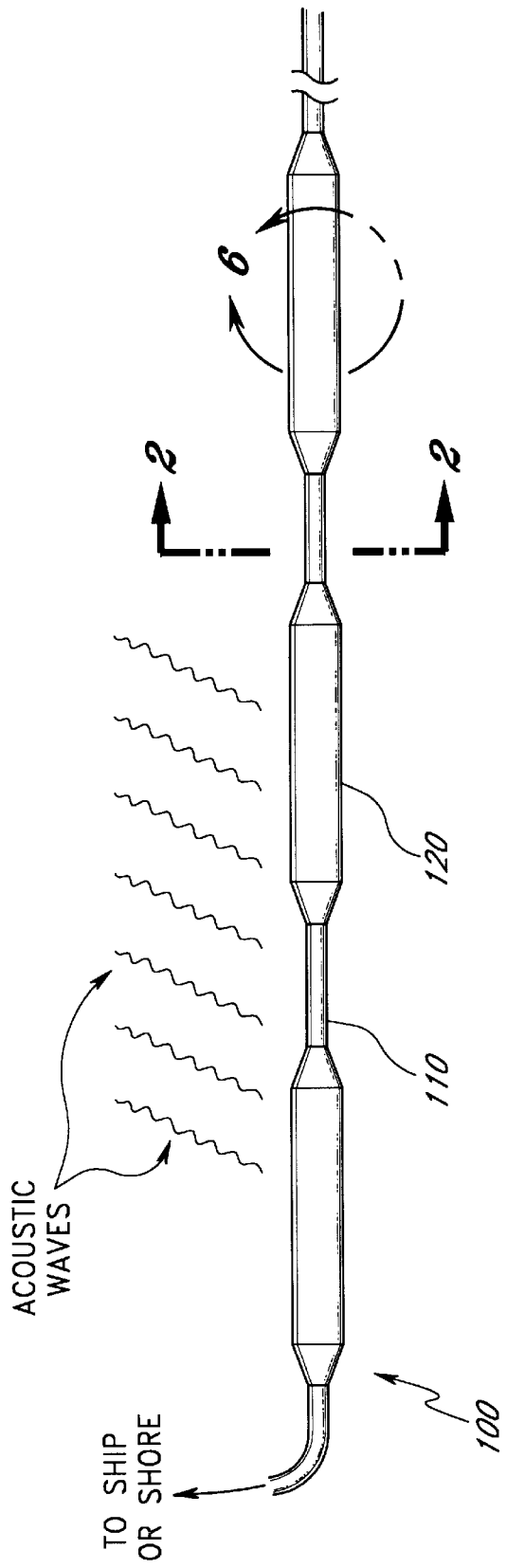
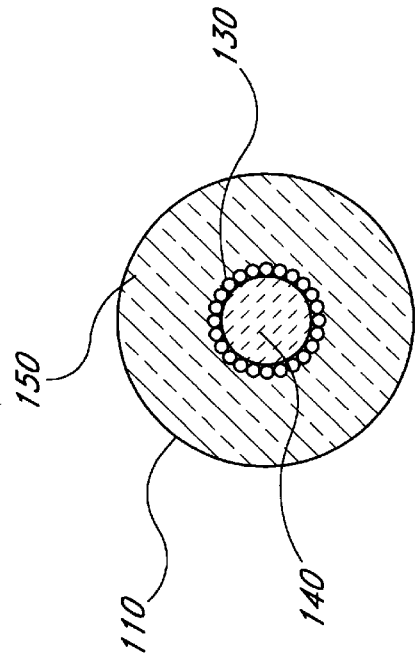
FIG. 1
FIG. 2

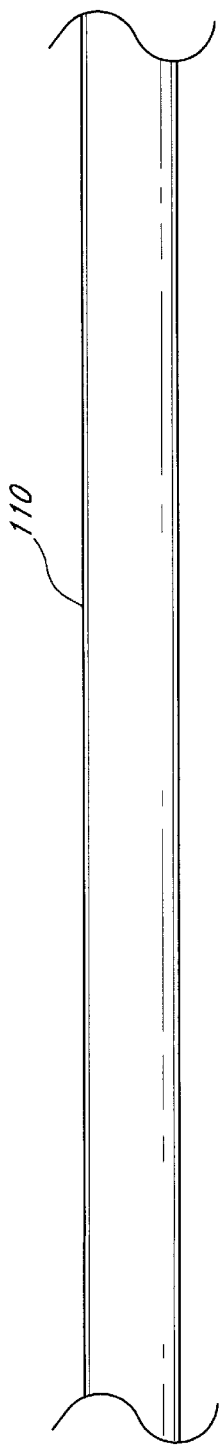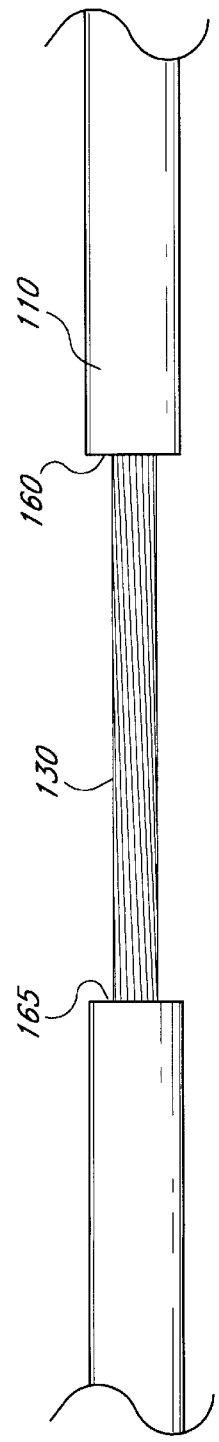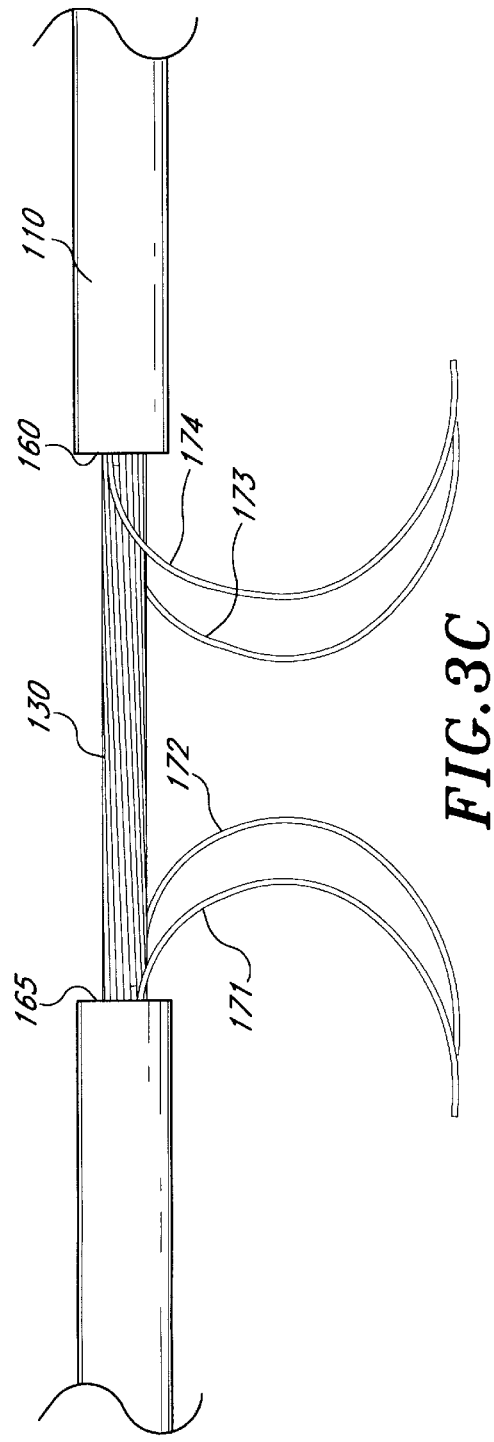

SYSTEM FOR SPLICING SENSORS INTO A MULTIPLE FIBER OPTICAL CABLE

BACKGROUND OF THE INVENTION

1. Field of the Invention

The present invention relates generally to sensor arrays for acoustic sensing systems, and more specifically, to an apparatus and method in which sensors are spliced inline in a multiple fiber cable while reducing the length of cable that must be opened up to accommodate the sensors.

2. Description of the Related Art

Arrays of fiber optic interferometric sensors show promise in applications where size, electrical interference, and electromagnetic detection make electronic sensors impractical. Such interferometric sensors are capable of measuring a parameter (i.e., a measurand) with a very high dynamic range (e.g., 120 dB). Optical sensor arrays are formed by connecting a series of sensors using fiber optic lines. If each sensor in an array requires a dedicated fiber to carry the detection signal, the large number of fibers required quickly becomes unwieldy as the number of sensors increases.

Optical couplers are commonly used to couple optical signals from a distribution bus to the sensors, and from the sensors to a return bus. In an array in which amplifiers are not used to periodically boost the signal strength, delivering sufficient optical signal to each of the sensors can be problematic. In addition, there may be significant variations in the optical power levels returned to the detectors, thereby complicating the signal processing.

Optical cable typically includes multiple fiber lines, some of which can be dedicated for distributing optical signals, and some for returning optical signals. Optical cable is not generally sold with sensors already spliced inline, however, since the needs of users with respect to the placement and the number of sensors varies greatly. Thus, sensors are normally spliced inline by the end user.

The splicing of a sensor inline involves opening up the cable by stripping back a portion of the sheath to expose the optical fibers housed therein. A distribution fiber is cut near the midpoint of the exposed, stripped back portion, and both ends of the cut fiber are fused, in turn, to leadlines from distribution ports of a sensor. This same procedure is used for a return fiber, which is coupled to return ports of the sensor. The stripped-back portion may need to be quite extensive to permit sufficiently long working lengths of fiber. For example, a splicing unit for fusing a fiber to a leadline of a sensor may be quite bulky, so that the cut fibers from the cable must extend some distance from the cable to the splicing unit.

After the sensor has been spliced to fibers within the cable, the sensor must be shielded from the environment, i.e., placed within some kind of housing which can be integrated with, and sealed to, the cable. The diameter of this housing is larger than that of the cable itself so that the sensor can reside within it. However, this results in a stiff and bulky cable which can present a problem, for example, when the cable is deployed or retracted, a problem that is exacerbated when the housing is longer.

Thus, there is a need for a technique for splicing fibers inline in a multiple fiber cable in which the length of the region affected by the splicing procedure is reduced.

SUMMARY OF THE INVENTION

One embodiment of the present invention is a method of splicing optical devices inline in a sheathed, multiple optical fiber cable. The method includes removing a portion of the sheath to form a region where the optical fibers are exposed, in which the exposed region extends longitudinally and includes a distal boundary and a proximal boundary. A first optical fiber is cut near the distal boundary of the exposed region, and a second optical fiber is cut near the proximal boundary of the exposed region. The cut first and second optical fibers are then fused to respective first and second ports of a device to permit at least a portion of optical radiation entering the device from the first optical fiber via the first port to exit the device via the second port through the second optical fiber. The first and second optical fibers may be distribution fiber lines or return fiber lines which receive output signals from the optical devices.

Another embodiment of the invention is an optical cable which includes a plurality of distribution optical fiber lines forming distribution optical channels and further includes a plurality of return optical fiber lines forming return optical channels. The optical cable also includes a plurality of sensors having inputs and outputs, in which respective ones of the inputs have been joined to two different ones of the distribution optical fiber lines, and respective ones of the outputs have been joined to two different ones of the return optical fiber lines. In a preferred embodiment, the number of the distribution optical fiber lines is one greater than the number of the distribution optical channels, and the number of the return optical fiber lines is one greater than the number of the return optical channels.

Yet another embodiment is a method of inserting a plurality of sensor units inline in a sheathed, multiple optical fiber cable to reduce the affected length of the cable. The method comprises coupling a first sensor unit to a first optical channel, which in turn comprises removing a first portion of the sheath to enable a first access to fibers within the cable, cutting a first fiber (which forms part of the first optical channel) at a point near a distal boundary of the removed portion to create a termination point on the first fiber, cutting a second fiber at a point near a proximal boundary of the removed portion to create a termination point on the second fiber, and fusing the respective termination points of the first and second fibers to ports on the first sensor unit to create an optical path in which the first optical channel is formed by the first fiber proximal to the first sensor unit and by the second fiber distal to the first sensor unit. The method further comprises optically connecting a second sensor unit to a second optical channel, which in turn comprises removing a second portion of the sheath to enable a second access to fibers within the cable, cutting a third fiber (which forms part of the second optical channel) at a point near a distal boundary of the second removed portion to create a termination point on the third fiber, cutting the first fiber at a point near a proximal boundary of the second removed portion to create a second termination point on the first fiber, and fusing the termination point of the third fiber and the second termination point of the first fiber to ports on the second sensor unit to create an optical path in which the second optical channel is formed by the third fiber proximal to the second sensor unit and by the first fiber distal to the second sensor unit.

Another embodiment of the invention is a method of forming n optical channels with at least n+1 optical fibers in a multi-sensor cable, which comprises, for the most proximal portion of the cable up to a first (most proximal) sensor, assigning a fiber to each of the n optical channels and designating at least one fiber as a first spare which is not assigned to any of the n optical channels, cutting and fusing a first fiber and cutting and fusing the first spare to the first sensor (in which the first fiber carries a first optical signal to the first sensor and the first spare carries the first optical signal to another sensor), the first fiber and the first spare forming part of a first one of the n optical channels, redesignating the first fiber past the first sensor as a second spare for a second portion of the cable between the first sensor and a second sensor, cutting and fusing the second spare and cutting and fusing a second fiber to the second sensor (in which the second fiber carries a second optical signal to the second sensor and the second spare carries the second optical signal to another sensor, the second spare and the second fiber forming part of a second one of the n optical channels), redesignating the second fiber past the second sensor as a third spare for a third portion of the cable between the second sensor and a third sensor, and repeating the cutting and fusing and the redesignating steps at subsequent sensors by redesignating respective fibers as respective spares beyond the subsequent sensors and using the redesignated spares to propagate respective optical signals.

BRIEF DESCRIPTION OF THE DRAWINGS

FIG. 1 shows one embodiment of the invention, in which a multiple fiber cable has sensors spliced inline at several points.

FIG. 2 is a cross section of the embodiment of FIG. 1, showing 24 fibers wrapped around a central strength member and surrounded by a protective plastic sheath.

FIGS. 3A–3F illustrate a sequence of steps showing how a sensor unit is spliced into a multiple fiber cable and coupled to both a distribution fiber and a return fiber.

DETAILED DESCRIPTION OF THE PREFERRED EMBODIMENT

Figure 3D:
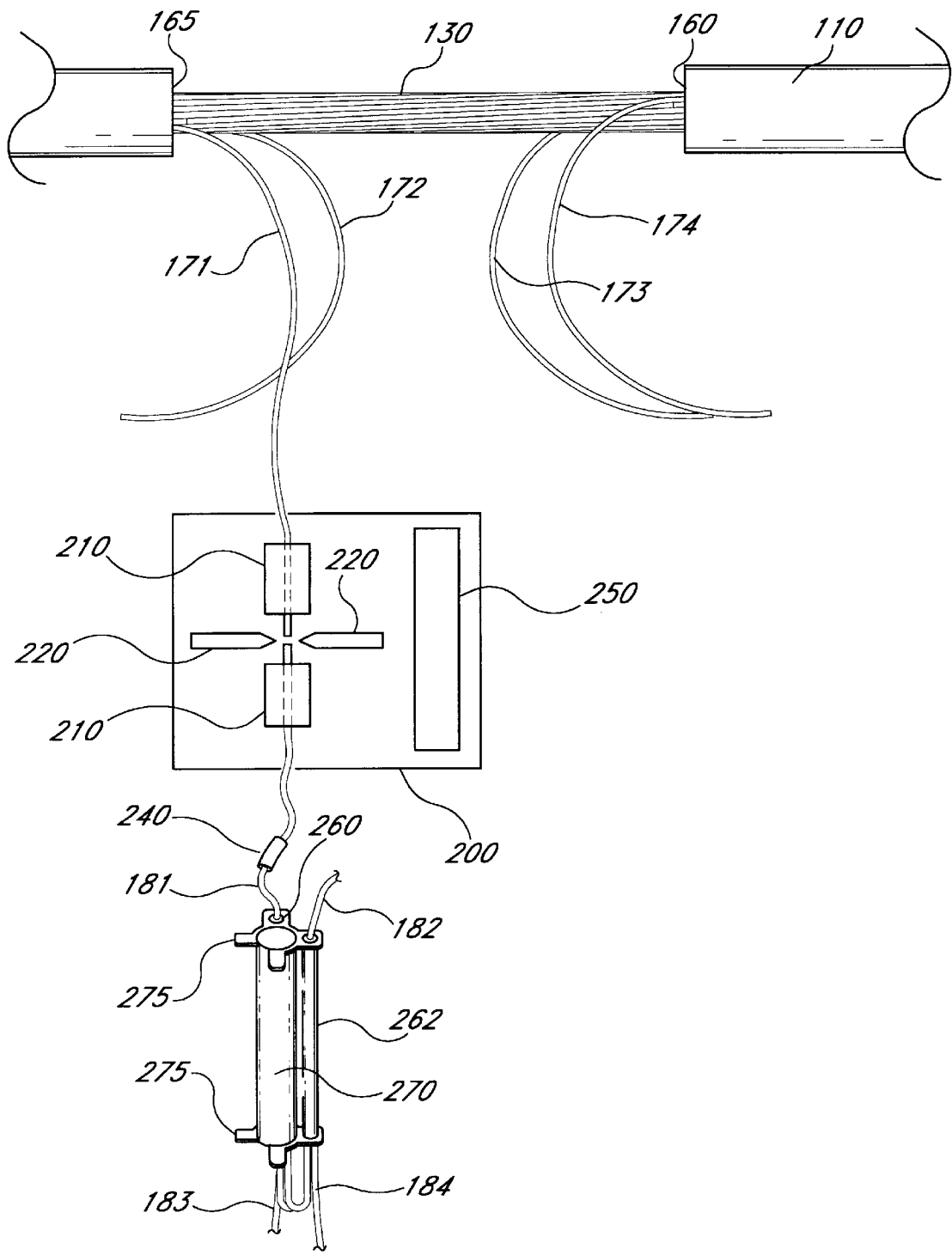

One embodiment of the invention as it is preferably deployed is illustrated in FIG. 1. An acoustic sensing system 100 is housed within a breakout cable 110 to protect sensitive components from the environment. For underwater applications, e.g., searching for undersea reservoirs of oil, the sensing system 100 is preferably deployed from a ship, with the proximal portion of the sensing system remaining on board or on shore. Sensors (not shown in FIG. 1) are spliced along the cable 110 at various points and reside within respective sensor housings 120. The length of the sensing system 100 and the number of sensors used may vary with the application, but it is typical to deploy 1 sensor every 20 to 50 meters over 5 to 20 km. Although the invention is described with respect to 1-channel systems (i.e., 1 sensor per nodal point), the invention can also be applied to multi-channel systems, such as those involving hydrophones, accelerometers, and magnetometers.

FIG. 2 shows a cross sectional view of the main body portion of the breakout cable 110. In one working embodiment, the cable 110 has an outside diameter (O.D.) of 23 mm. In one preferred embodiment, 24 fibers 130 are wound helically with a 3–6% lay loss (i.e., in which the fibers are 3–6% longer than the cable) around a central strength member 140, which is preferably Kevlar and may advantageously be 7 mm in diameter. A 25-mm wide, thin (preferably less than 0.1 mm) Mylar sheath (not shown) is preferably helixed around the fibers 130, with the Mylar sheath and fibers being surrounded by a jacket 150 that is preferably plastic, such as polyurethane. The fiber lines 130 may comprise an approximately 9 micron core surrounded by a 125 micron O.D. glass cladding (not shown), which is surrounded by a 250 micron O.D. plastic (e.g., acrylate) jacket (not shown), which is in turn surrounded by a 900 micron O.D. jacket (not shown) of another plastic such as Hytrel.

One embodiment of the invention is a method for splicing devices (e.g., sensors) inline in a multiline fiber cable such as the cable 110. Various steps associated with a preferred embodiment of this method are illustrated in FIGS. 3A–3F. FIGS. 3A and 3B show the cable 110 before and after a portion of the cable's jacket 150 is removed, preferably with a hot knife. Removing a portion of the cable 110 creates a region where the plurality of fibers 130 within the cable are exposed, with this region preferably extending 180 mm in the longitudinal direction and defined by distal (i.e., further from ship or shore) and proximal (i.e., closer to ship or shore) boundaries 160 and 165, respectively. In one preferred embodiment, 24 fibers are used, with 7 of those fibers being used as distribution fibers to distribute optical signals to sensors (or other devices including optical devices), and the other 17 fibers being used as return fibers to return optical signals from the sensors.

The next step is to prepare the fiber lines 130 for splicing to a first sensor. In FIG. 3C, four different fiber lines 130 are cut, two near the distal boundary 160 (a distribution fiber 171 and a return fiber 172) and two near the proximal boundary 165 (a distribution fiber 173 and a return fiber 174), thereby creating termination points on each of the four cut fiber lines. The plastic layers surrounding the distribution fiber 171 may be cut back by 12–24 mm to expose the glass cladding of the fiber 171. Likewise, a fiber leadline 181 from a port of a sensor unit 190 may be similarly prepared, in which each sensor unit 190 has a distribution end 194 and a return end 196 for accepting distribution and return fibers, respectively. Respective glass cores of the distribution fiber 171 and the fiber leadline 181 may be fusion spliced together as illustrated in FIG. 3D. For this purpose, a splicer 200 such as a 925 Ericsson or Fujikura 30CS may be used. The exposed fiber cores of the fiber 171 and the fiber leadline 181 may be inserted into respective chucks 210 of the splicer 200 and held between oppositely facing electrodes 220 while the cores are fused together.

Figure 3E:
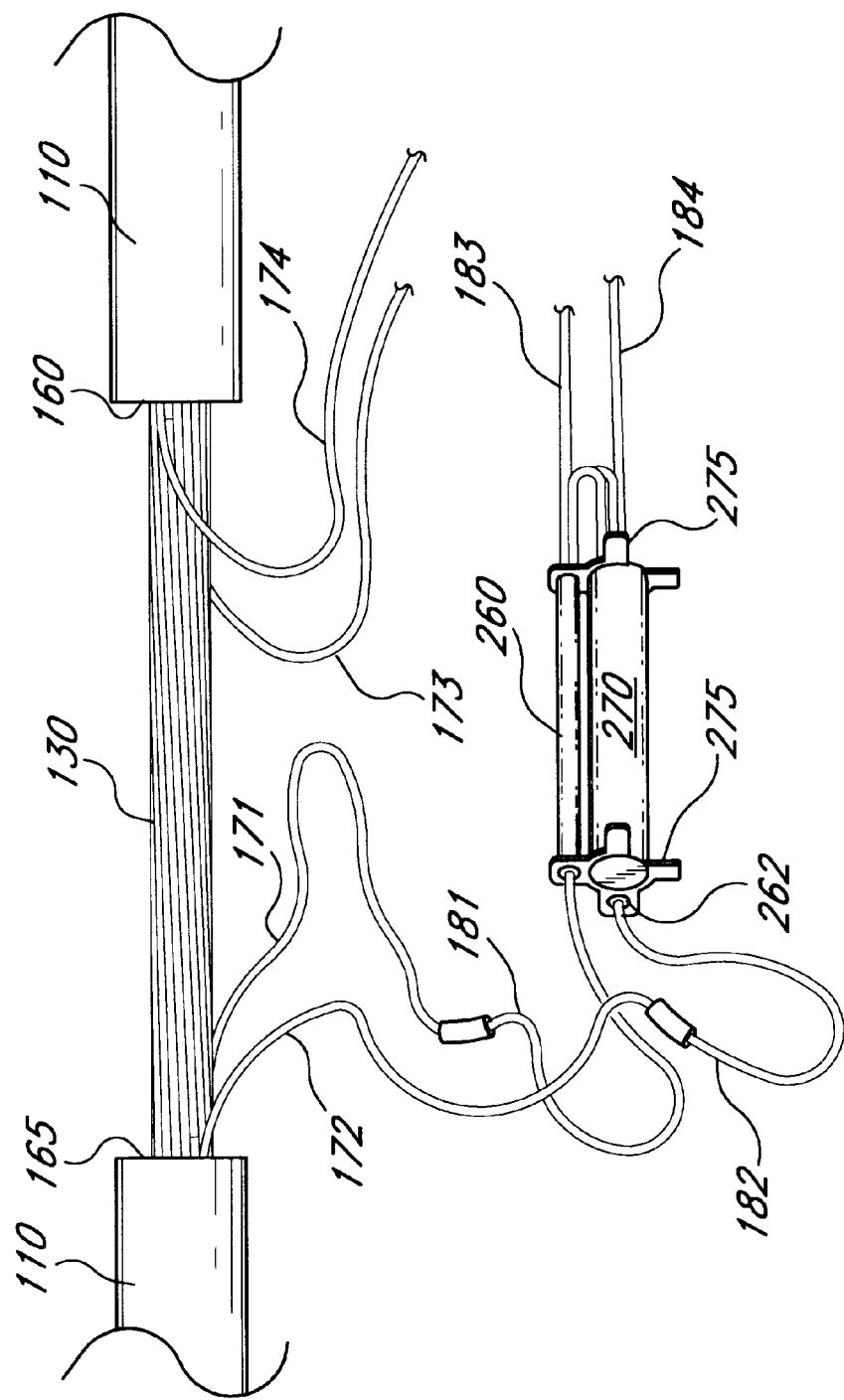

The resulting splice 230 is indicated in FIG. 3E. At this point, a segment of heat shrink material 240 which has been prepositioned over the fiber leadline 181 may be slid over the splice 230 and fixed in place with an oven 250. The heat shrink segment 240 is preferably less than 2 mm in diameter and may be 60 mm long to completely cover both the spliced region and the exposed fiber cores and claddings of the fiber 171 and the fiber leadline 181, as well as to overlap the respective plastic jackets of the fiber 171 and the fiber leadline 181.

Figure 3F:
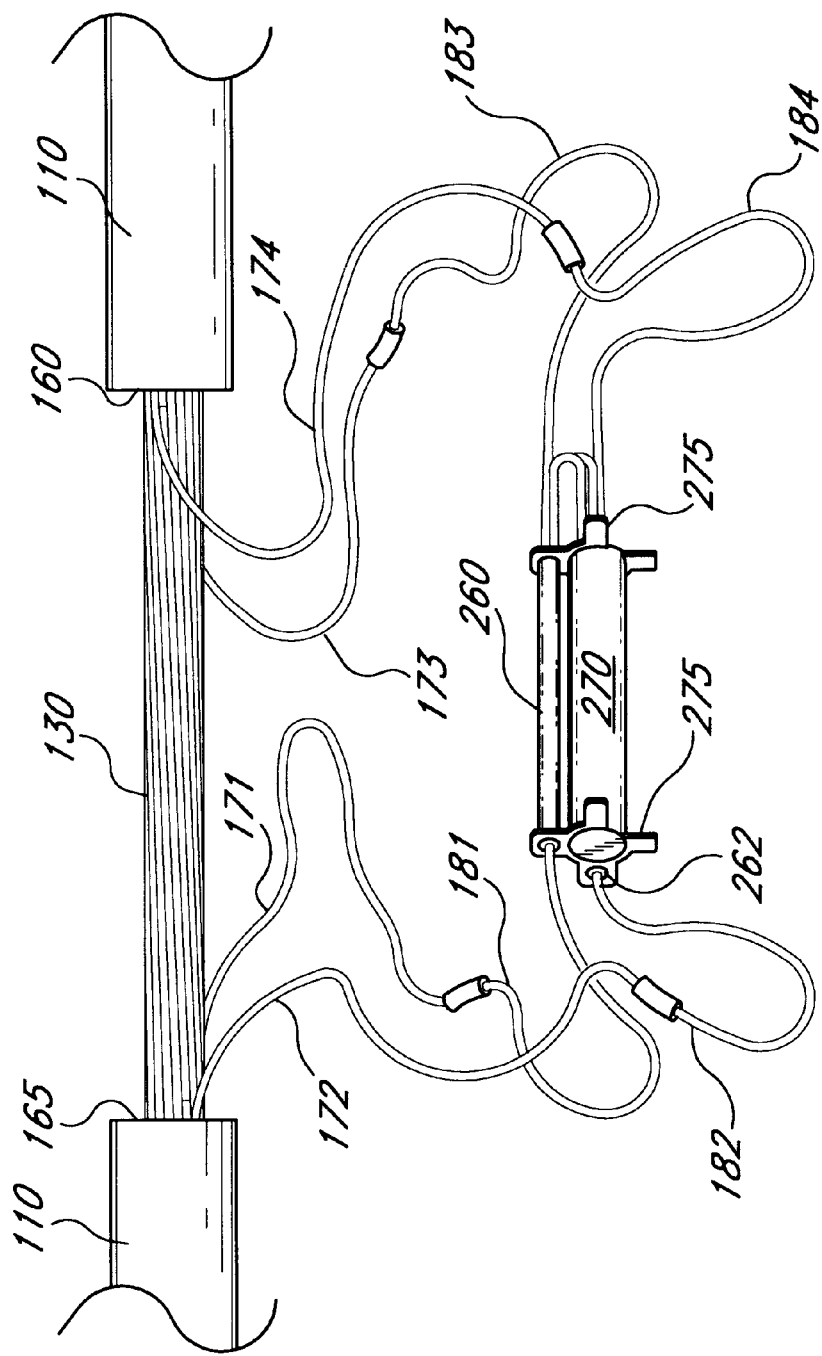

This process is repeated for the other fibers. Specifically, the distribution fiber 173 is spliced to a fiber leadline 183, the return fiber 172 is spliced to a fiber leadline 182, and the return fiber 174 is spliced to a fiber leadline 184, as shown in FIG. 3F, in which the fiber leadlines 182–184 originate from different ports of the sensor unit 190. Thus, the distribution fibers 171 and 173 are effectively joined (spliced) to the ports of the distribution end 194 of the sensor unit 190, and the return fibers are effectively joined (spliced) to the ports of the return end 196 of the sensor 190 unit.

Figure 4:
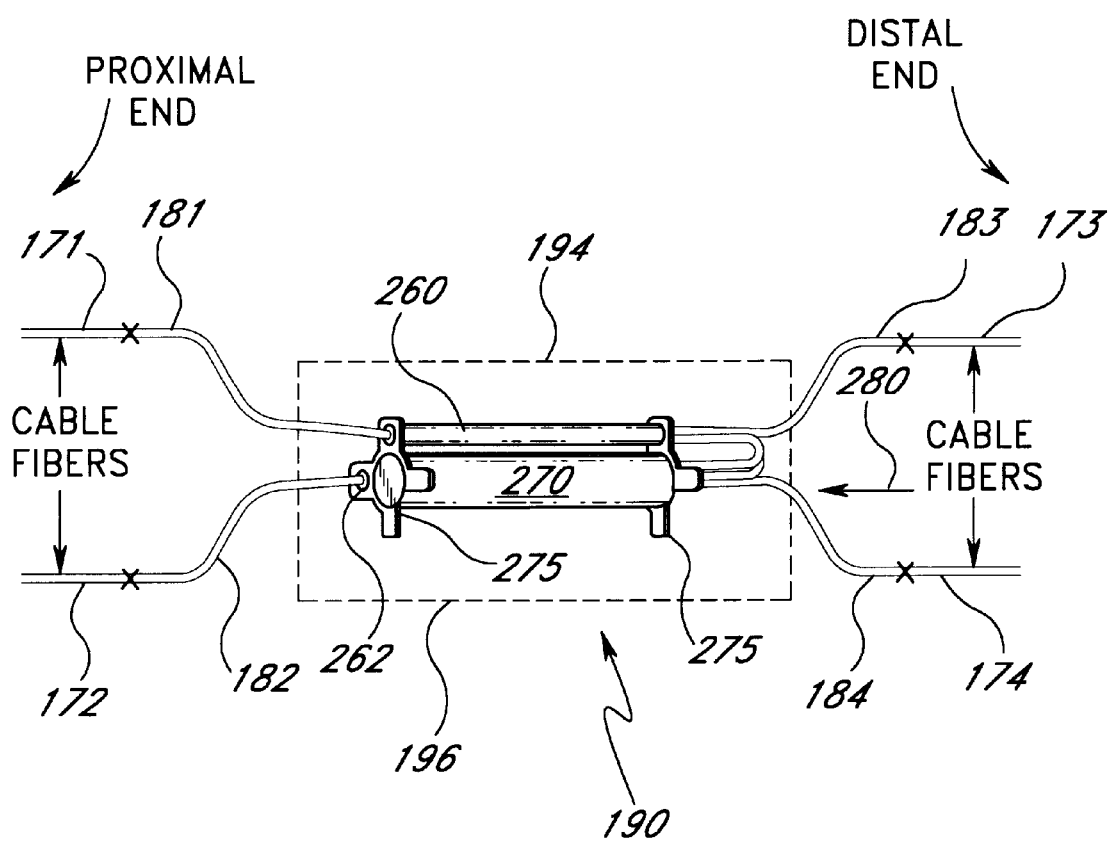
FIG. 4 is a schematic of the sensor unit of FIGS. 3D–3F, showing the light paths through the unit's sensor and couplers.

The functional relationships between the fibers 171–174, fiber leadlines 181 184, and the sensor unit 190 is illustrated in FIG. 4. The sensor unit 190 preferably includes distribution and return tap couplers 260 and 262 and a sensor 270, which is responsive to impinging acoustic signals that vary the amplitude of optical radiation passing through the sensor. The sensors 270 herein may be advantageously Mach-Zehnder interferometers. Mechanical support rings 275 are located at both ends of the sensor unit 190 and are discussed further below. The distribution end 194 of the sensor unit 190 receives an input optical signal through the distribution fiber line 171 and the fiber leadline 181. A portion of this optical signal is coupled through the sensor 270, with the remainder being directed through the fiber leadline 183 and the distribution fiber line 173 to other sensor units. Similarly, returned optical signals pass through the return fiber line 174 and the fiber leadline 184 to the coupler 262 at the return end 196 in the sensor unit 190, and then away from the coupler 262 via the fiber leadline 182 and the return fiber 172. Output optical signals from the sensor 270 are also directed through the fiber leadline 182 and the return fiber line 172. The direction of propagation of optical signals is indicated by the arrows 180 shown in FIGS. 3F and 4.

Figure 5:
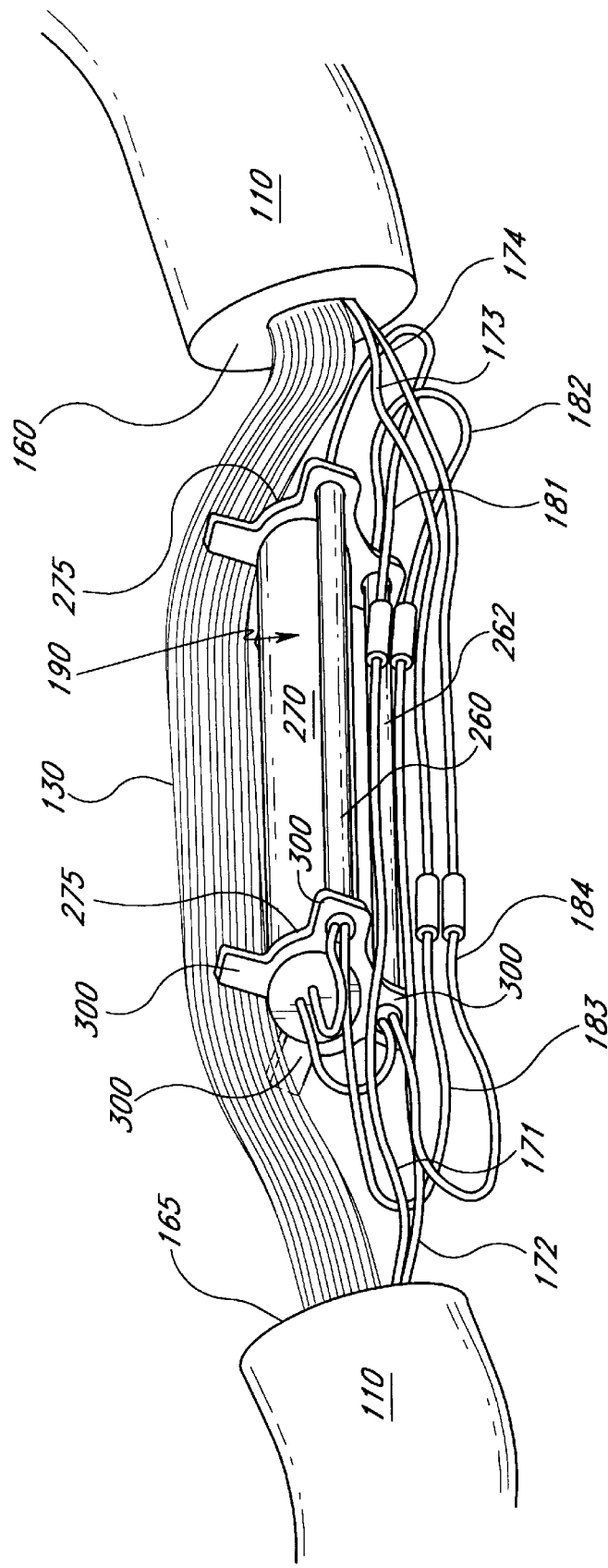
FIG. 5 is a perspective view of a sensor unit, the optical cable, and their surrounding mechanical support structure.
Figure 6:
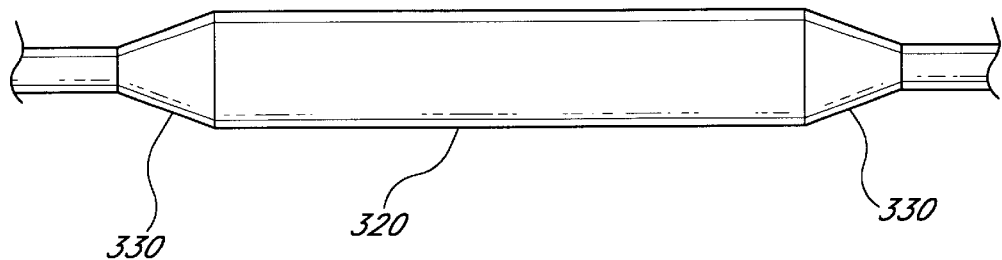
FIG. 6 shows the potting tube and end cups which are placed around the sensor unit and the optical cable following the splicing procedure.

Following splicing of the fibers 171–174 and the fiber leadlines 181–184 to the sensor unit 190, the sensor unit is preferably secured within the cable 110 to reduce the probability of it being damaged. As shown in FIG. 5, four posts 300 (preferably comprising plastic such as polyurethane) extend from each of the mechanical support rings 275 at either end of the sensor unit 190. Since the sensor unit 190 is preferably 18 mm in diameter, the posts 300 may advantageously be 9 mm long and 2 mm thick. To accommodate the length of the fibers 171–174 and the fiber leadlines 181–184, the sensor unit 190 is preferably rotated 180 degrees before being placed within the potting tube 320, as illustrated in FIG. 5.

At this point, a 230 mm long, 60 mm O.D. potting tube 320 is preferably placed around the sensor unit 190 and the fibers 130. Potting material such as Scotch Cast #9 is injected into the potting tube 320 and around the sensor unit 190 and the fibers 130, and strain relief end cups 330 are injected in place at both ends of the potting tube 320 to form a seal. The length of the sensor housing 120, which includes the potting tube 320 and the two end cups 330, is approximately 330 mm.

The embodiment shown in FIGS. 3F and 4 is functionally substantially equivalent to cutting and fusing a single distribution fiber and a single return line to the sensor unit 270. A significant advantage of the present invention, however, is that by coupling two separate distribution fibers and two separate return fibers to the sensor unit 270, and in particular, by cutting these fibers near the distal and proximal boundaries 160 and 165 as described herein, the user has longer lengths of fiber with which to work (for a given distance between the distal and proximal boundaries 160 and 165). Thus, with the method disclosed herein, the region of the cable 110 that is removed to expose the fibers 130 (i.e., the distance between the distal and proximal boundaries 160 and 165 as shown in FIG. 3B) can be kept short, e.g., to preferably 180 mm or less. Otherwise, the length of cable that would be opened would be prohibitively long, in order to make the fibers 130 long enough to reach the splicer 200.

The relatively short distance between the distal and proximal boundaries 160 and 165 results in the cable 110 having reduced stiffness and greater flexibility. An additional advantage is that the diameter of any reel used to deploy or retract the cable 110 may be reduced.

To achieve these advantages, an extra distribution fiber and an extra return fiber are included with the fibers 130, so that for each of the distribution and return ends 194 and 196 of the sensor units 190, a pair of different fibers can be used, with one fiber being cut at its distal end and the other at its proximal end (see, for example, FIGS. 3F and 4). Thus, the number of distribution fibers is at least one greater than the number of distribution optical channels, and the number of return fibers is at least one greater than the number of return optical channels.

Figure 7:
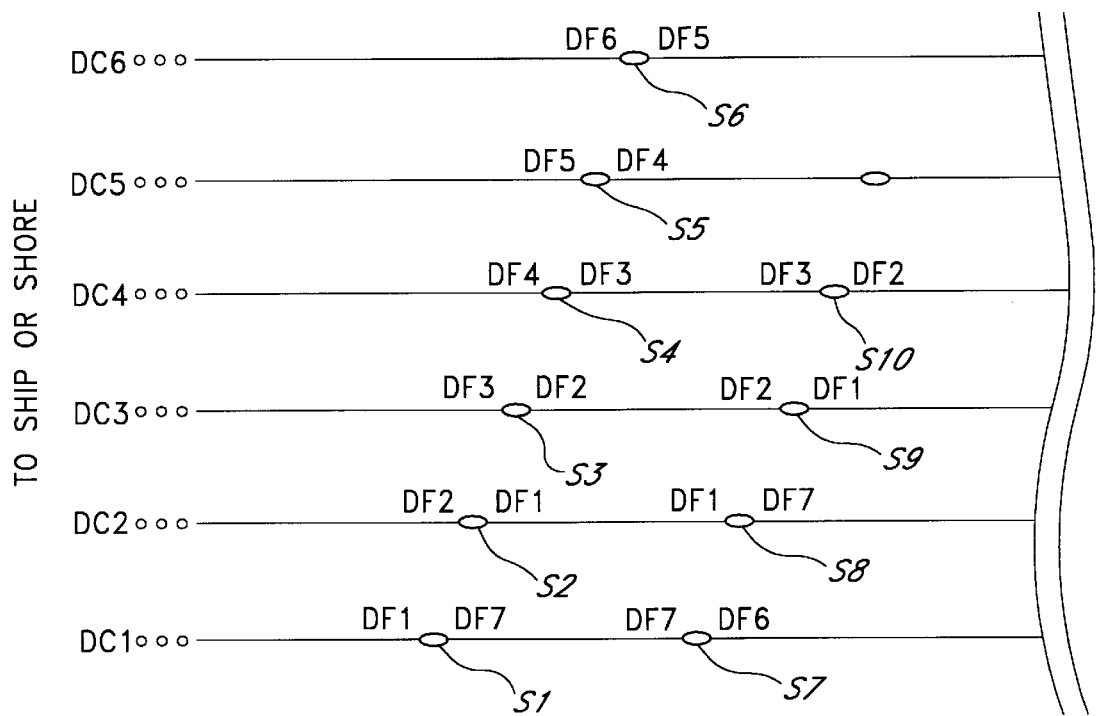
FIG. 7 is a schematic of one preferred embodiment showing the relationship between seven distribution fibers and their corresponding six distribution optical channels.

One implementation of this method is shown schematically in FIG. 7, in which six distribution optical channels DC1–DC6 carrying respective optical signals are used. At the proximal end of the cable 110, the distribution fibers designated DF1–DF6 correspond to the six distribution optical channels DC1–DC6. At the first sensor 270 (designated here as S1), the distribution fiber DF1 and a "spare" distribution fiber DF7 are coupled to the distribution end of the first sensor, in accordance with the method outlined in FIGS. 3A–3F. Thus, the first distribution channel at the first sensor S1 involves two different distribution fibers, DF1 and DF7.

Immediately after S1, however, the distribution fiber DF1 is no longer dedicated to any one of the six optical channels DC1–DC6. Thus, DF1 effectively becomes the "spare" and can be coupled to the second sensor S2, as indicated in FIG. 7. After sensor S2, however, the spare distribution fiber becomes DF2. This pattern continues, with the identity of the spare distribution fiber being rotated through the seven distribution fibers DF1–DF7, so that, for example, the distribution fiber DF7 and distribution fiber DF6 are part of the first optical channel at sensor S8.

In a preferred embodiment involving 16 return optical channels, a total of 17 return fibers are used, with an alternate one of the 17 return fibers serving as the spare fiber in the return bus, in analogy with the distribution fiber arrangement of FIG. 7.

The invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within that scope.

What is claimed is:

1. A method of splicing optical devices inline in a sheathed, multiple optical fiber cable, comprising:

removing a portion of the sheath to form a region where the optical fibers are exposed, the exposed region extending longitudinally and including a distal boundary and a proximal boundary;

cutting a first optical fiber near the distal boundary of the exposed region;

cutting a second optical fiber near the proximal boundary of the exposed region; and fusing the cut first and second optical fibers to respective first and second ports of a device to permit at least a portion of optical radiation entering the device from the first optical fiber via the first port to exit the device via the second port through the second optical fiber.

2. The method of claim 1, wherein the first and second optical fibers are distribution fiber lines.

3. The method of claim 1, wherein the first and second optical fibers are return fiber lines which receive output signals from the optical devices.

4. The method of claim 1, further comprising:
cutting a third optical fiber on the distal side of the exposed region;
cutting a fourth optical fiber on the proximal side of the exposed region; and
splicing the cut third and fourth optical fibers to respective third and fourth ports of the device.

5. The method of claim 4, wherein the first and second optical fibers are distribution lines and the third and fourth optical fibers are return fiber lines.

6. The method of claim 1, wherein the optical devices comprise sensors.

7. The method of claim 1, wherein said fusing the cut first and second optical fibers to respective first and second ports comprises fusing the cut first and second optical fibers to respective fiber leadlines.

8. An optical cable, comprising:
a plurality of distribution optical fiber lines forming distribution optical channels;
a plurality of return optical fiber lines forming return optical channels; and
a plurality of sensors having inputs and outputs;
wherein respective ones of said inputs are joined to two different ones of said distribution optical fiber lines, and respective ones of said outputs are joined to two different ones of said return optical fiber lines.

9. The optical cable of claim 8, wherein the number of said distribution optical fiber lines is greater than the number of said distribution optical channels, and the number of said return optical fiber lines is greater than the number of said return optical channels.

10. The optical cable of claim 9, wherein the number of said distribution optical fiber lines is one greater than the number of said distribution optical channels, and the number of said return optical fiber lines is one greater than the number of said return optical channels.

11. A method of inserting a plurality of sensor units inline in a sheathed, multiple optical fiber cable to reduce the affected length of the cable, the method comprising:
(i) coupling a first sensor unit to a first optical channel, comprising:
removing a first portion of the sheath to enable a first access to fibers within the cable;
cutting a first fiber, which forms part of the first optical channel, at a point near a distal boundary of the removed portion to create a termination point on the first fiber;
cutting a second fiber at a point near a proximal boundary of the removed portion to create a termination point on the second fiber;
fusing the respective termination points of the first and second fibers to ports on the first sensor unit to create an optical path in which the first optical channel is formed by the first fiber proximal to the first sensor unit and by the second fiber distal to the first sensor unit; and
(ii) optically connecting a second sensor unit to a second optical channel, comprising:
removing a second portion of the sheath to enable a second access to fibers within the cable;
cutting a third fiber, which forms part of the second optical channel, at a point near a distal boundary of the second removed portion to create a termination point on the third fiber;
cutting the first fiber at a point near a proximal boundary of the second removed portion to create a second termination point on the first fiber; and
fusing the termination point of the third fiber and the second termination point of the first fiber to ports on the second sensor unit to create an optical path in which the second optical channel is formed by the third fiber proximal to the second sensor unit and by the first fiber distal to the second sensor unit.

12. The method of claim 11, wherein the optical fibers are distribution fiber lines.

13. The method of claim 11, wherein the optical fibers are return fiber lines which receive output signals from sensors.

14. A method of forming n optical channels with at least n+1 optical fibers in a multi-sensor cable, comprising:
for the most proximal portion of the cable up to a first (most proximal) sensor, assigning a fiber to each of the n optical channels and designating at least one fiber as a first spare which is not assigned to any of the n optical channels;
cutting and fusing a first fiber and cutting and fusing the first spare to the first sensor, wherein the first fiber carries a first optical signal to the first sensor and the first spare carries the first optical signal to another sensor, the first fiber and the first spare forming part of a first one of the n optical channels;
redesignating the first fiber past the first sensor as a second spare for a second portion of the cable between the first sensor and a second sensor;
cutting and fusing the second spare and cutting and fusing a second fiber to the second sensor, wherein the second fiber carries a second optical signal to the second sensor and the second spare carries the second optical signal to another sensor, the second spare and the second fiber forming part of a second one of the n optical channels;
redesignating the second fiber past the second sensor as a third spare for a third portion of the cable between the second sensor and a third sensor; and
repeating said cutting and fusing and said redesignating at subsequent sensors by redesignating respective fibers as respective spares beyond the subsequent sensors and using the redesignated spares to propagate respective optical signals.

15. The method of claim 14, wherein the optical fibers are distribution fiber lines.

16. The method of claim 14, wherein the optical fibers are return fiber lines which receive output signals from sensors.

17. The method of claim 1, wherein at least one of the optical devices comprises a hydrophone, an accelerometer, or a magnetometer.

18. The optical cable of claim 8, wherein at least one of said sensors comprises a hydrophone, an accelerometer, or a magnetometer.

19. The method of claim 11, wherein at least one of the sensor units comprises a hydrophone, an accelerometer, or a magnetometer.

20. The method of claim 10, wherein said number of said distribution optical fiber lines is 7 and said number of said return optical fiber lines is 17.

* * * * *